US012598406B2

(12) United States Patent (10) Patent No.: US 12,598,406 B2

Van Veen et al. (45) Date of Patent: Apr. 7, 2026

(54) CONTROL OF ONU ACTIVATION IN HIGH BIT RATE PONs

(71) Applicant: Nokia Solutions and Networks Oy, Espoo (FI)

(72) Inventors: Doutje Van Veen, New Providence, NJ (US); Vincent Houtsma, New Providence, NJ (US)

( * ) Notice: Subject to any disclaimer, the term of this patent is extended or adjusted under 35 U.S.C. 154(b) by 289 days.

(21) Appl. No.: 18/105,307

(22) Filed: Feb. 3, 2023

(65) Prior Publication Data

US 2024/0267658 A1 Aug. 8, 2024

(51) Int. Cl.
*H04Q 11/00* (2006.01)
*H04J 14/02* (2006.01)

(52) U.S. Cl.
CPC ...... *H04Q 11/0067* (2013.01); *H04J 14/0216* (2013.01); *H04J 14/028* (2013.01); *H04Q 2011/0045* (2013.01); *H04Q 2011/0064* (2013.01); *H04Q 2011/0088* (2013.01)

(58) Field of Classification Search
CPC .................................................. H04Q 11/0067
See application file for complete search history.

(56) References Cited

U.S. PATENT DOCUMENTS

| | | | | |
|---|---|---|---|---|
| 2010/0034534 A1* | 2/2010 | Niibe | .................. | H04J 14/0252 |
| | | | | 398/25 |
| 2015/0138996 A1* | 5/2015 | Ince | ........................ | H04L 43/50 |
| | | | | 370/252 |
| 2021/0391922 A1* | 12/2021 | Geng | ................. | H04B 10/0795 |
| 2024/0291569 A1* | 8/2024 | Yang | .................... | H04B 10/675 |

FOREIGN PATENT DOCUMENTS

| | | | |
|---|---|---|---|
| CN | 114666684 | | 6/2022 |
| CN | 114666684 A | * | 6/2022 |
| EP | 3985893 | | 4/2022 |

* cited by examiner

*Primary Examiner* — Shi K Li

(74) *Attorney, Agent, or Firm* — Capital Pand And Trademark Law Firm, PLLC

(57) ABSTRACT

A method and apparatus is proposed for performing the ONU activation process in a PON having a standard line rate of 50G or higher. The method and apparatus are based upon having the OLT instruct any activating ONUs to transmit at a line rate that is less than 50G, which allows for an OLT receiver without any particular equalization configuration to accurately recover the upstream burst-mode transmissions from the activating ONUs. Once the activation process is completed, the OLT may instruct the new ONUs to reset their transmitters to operate at the higher line rate of the PON. Alternatively, at the end of the activation process, the new ONUs may be configured to automatically reset their transmitters to higher line rate.

14 Claims, 5 Drawing Sheets

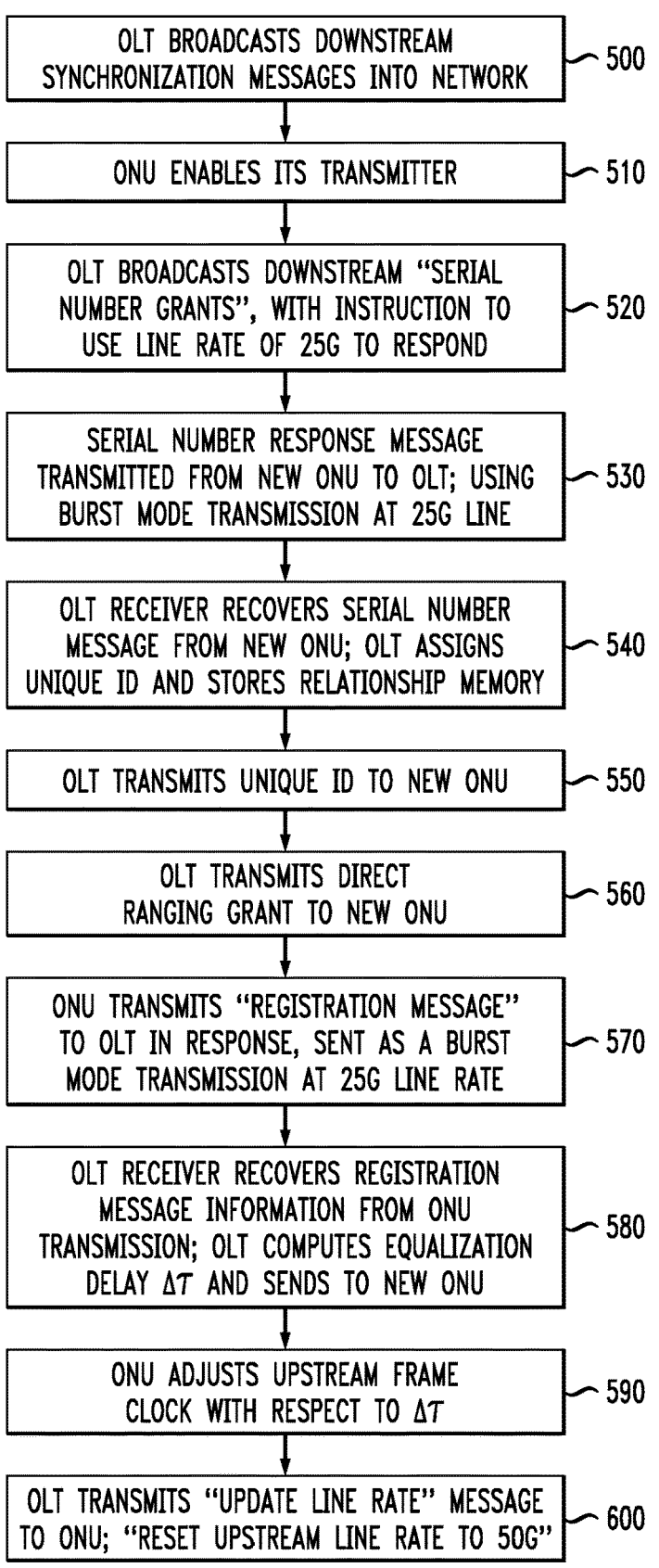

OLT BROADCASTS DOWNSTREAM SYNCHRONIZATION MESSAGES INTO NETWORK — 500

ONU ENABLES ITS TRANSMITTER — 510

OLT BROADCASTS DOWNSTREAM "SERIAL NUMBER GRANTS", WITH INSTRUCTION TO USE LINE RATE OF 25G TO RESPOND — 520

SERIAL NUMBER RESPONSE MESSAGE TRANSMITTED FROM NEW ONU TO OLT; USING BURST MODE TRANSMISSION AT 25G LINE — 530

OLT RECEIVER RECOVERS SERIAL NUMBER MESSAGE FROM NEW ONU; OLT ASSIGNS UNIQUE ID AND STORES RELATIONSHIP MEMORY — 540

OLT TRANSMITS UNIQUE ID TO NEW ONU — 550

OLT TRANSMITS DIRECT RANGING GRANT TO NEW ONU — 560

ONU TRANSMITS "REGISTRATION MESSAGE" TO OLT IN RESPONSE, SENT AS A BURST MODE TRANSMISSION AT 25G LINE RATE — 570

OLT RECEIVER RECOVERS REGISTRATION MESSAGE INFORMATION FROM ONU TRANSMISSION; OLT COMPUTES EQUALIZATION DELAY $\Delta T$ AND SENDS TO NEW ONU — 580

ONU ADJUSTS UPSTREAM FRAME CLOCK WITH RESPECT TO $\Delta T$ — 590

OLT TRANSMITS "UPDATE LINE RATE" MESSAGE TO ONU; "RESET UPSTREAM LINE RATE TO 50G" — 600

CONTROL OF ONU ACTIVATION IN HIGH BIT RATE PONs

TECHNICAL FIELD

Disclosed herein is a technique for activating optical network units (ONUs) joining a passive optical network (PON).

BACKGROUND

A PON is known as comprising a collection of disparate ONUs that communicate with customer locations and direct communications to/from an optical line terminal (OTL) through an optical distribution network (ODN). The ODN comprises a tree and branch topology of optical fiber spans that are used to provide communication between a single OLT and the collection of disparate ONUs.

The PON is dynamic in the sense that individual ONUs may either join or leave the network at any point in time. Standards organizations such as ITU-T have developed specific protocols that may be followed to ensure that a common procedure is utilized for making changes in the PON, regardless of the equipment supplier, network provider, etc. In particular, the steps followed to add a new ONU to an existing PON may utilize an "activation cycle" protocol described in the ITU-T standard G.9804.2, *"Higher speed passive optical network—Common transmission convergence layer specification."*

An ONU activation cycle includes three sequential phases: downstream synchronization between the OLT and a new ONU, discovery/serial number acquisition from a new ONU, and ranging. The ranging phase is used to determine the transmission delay attributed to the physical separation between the new ONU and the OLT. The transmission delay is critical information since the passive network architecture relies on time-division techniques for controlling communication between a large number of individual ONUs and a single OLT.

In light of the introduction of a 50 Gb/s ("50 G") line rate for passive optical networks, there are at least three different classes of ONUs that can all receive 50 G downstream data but can only transmit upstream data at one of these of 12.5, 25, or 50 G rates. The activation process requires the OLT to properly decode burst-mode upstream messages at 12.5 G and 25 G as well as 50 G messages from each of the new ONUs. At the 50 G upstream line rate, it becomes necessary to use equalization techniques at the OLT's receiver to properly recover the information in the burst. Without a priori knowledge of the particular receiver equalization required for the new OLT (which may be determined during a following receiver training process), it is quite possible that the OLT's recovery of activation messages from the new ONU (particularly, but not limited to the ranging information) may include significant errors.

SUMMARY

A proposed solution to the problems associated with performing ONU activation in a high line rate PON is presented. In particular, it is proposed to perform the ONU activation process at a lower line rate than the 50 G upstream rate that is now being used in symmetrical 50 GPONs. The use of a lower line rate (e.g., 25 G or even 12.5 G) improves the accuracy of the recovered upstream messages at the OLT since receiver equalization techniques are not necessary at these lower line rates. Inasmuch as the ranging process involves a calculation of the message delay between the OLT and the new ONU, where the calculation is independent of the line rate used to transmit messages between the OLT and the new ONU, it may be presumed that there is no loss in accuracy by performing the activation steps at a lower line rate, and then switching to the higher line rate once the activation process is completed.

In accordance with the disclosed solution, it is proposed to configure an OLT to request that a new 50 G ONU transmit activation messages at a line rate less than 50 G (for example, 25 G). The OLT may directly message the new 50 G ONU to use a lower line rate for activation, or the ONU itself may be preconfigured to automatically use the lower line rate during activation. The OLT may be further configured to communicate, in some example embodiments, a "switch line rate" message to the new ONU once the activation process is completed, allowing the activated ONU to now operate at the preferred 50 G (or higher) upstream line rate. Other example embodiments may rely on the newly-activated ONU to recognize the end of the activation process and automatically switch over to the higher line rate (e.g., 50 G) for initiating data transmission.

One example of the disclosed concepts takes the form of an apparatus for use by an optical line terminal (OLT) in a passive optical network (PON) operating at a predefined upstream line rate, where the OLT is communicatively connected to optical network units (ONUs). The apparatus in this example comprising: at least one memory including instructions; at least one processor configured to execute the instructions and cause the apparatus to perform an ONU activation process including: instructing the ONUs to operate at a low line rate that is less than the predefined upstream line rate; recovering burst-mode upstream activation messages transmitted at the instructed low line rate from one or more ONUs; generating, in response to the recovered burst-mode low line rate activation messages from a new ONU, specific ONU operating parameters; and transmitting the specific ONU operating parameters to the new ONU. As discussed above, a new 50 G ONU may already be preconfigured to perform the activation process at a lower line rate, obviating the need for the OLT to instruct the new 50 G ONU to do so.

Another example of the disclosed concepts may take the form of a method for use by an OLT during an ONU activation process when communicatively connected to a plurality of ONUs within a PON operating at a predefined upstream line rate, where the method includes the steps of: if required, instructing the ONUs to operate at a low line rate that is less than the predefined upstream line rate; recovering burst-mode upstream activation messages transmitted at the instructed low line rate from one or more ONUs; generating (in response to the recovered burst-mode low line rate activation messages from a new ONU) specific ONU operating parameters; and transmitting the specific ONU operating parameters to the new ONU.

BRIEF DESCRIPTION OF THE DRAWINGS

Referring now to the drawings, some example embodiments will now be described, where FIG. 1 is a diagram of an example architecture of a PON;

FIG. 4 is a block diagram of an example OLT configured to initiate and perform ONU activation at a line rate that is lower than the predefined upstream line rate; and FIG. 5 contains an example flow chart for a low line rate ONU activation process as performed by an OLT.

DETAILED DESCRIPTION

Figure 1:
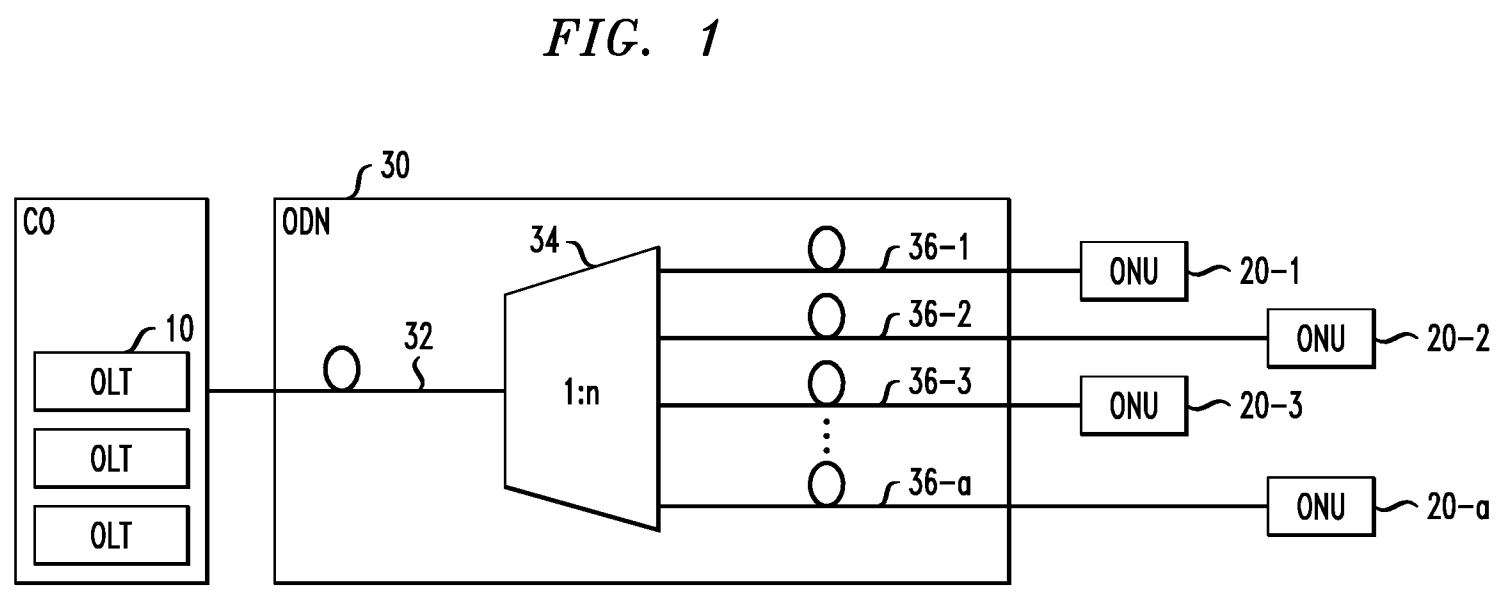
Figure 2:
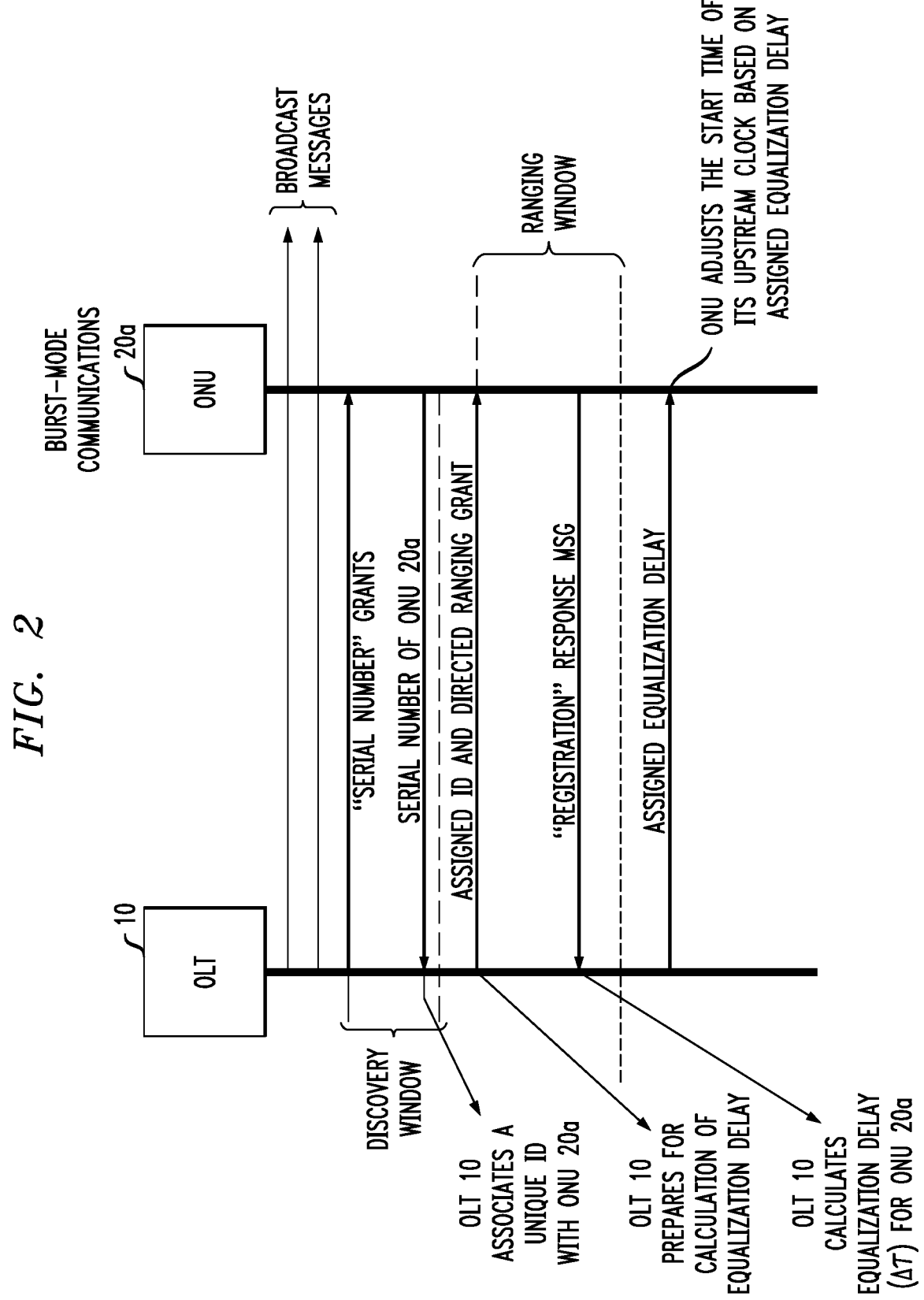
FIG. 2 is a message flow diagram associated with a typical activation process for establishing communication between the OLT and a new ONU recently added to the PON.

FIG. 1 is a diagram of an example PON, illustrating a basic architecture of an OLT 10 that communicates with a plurality of ONUs 20 via an ODN 30. ODN 30 may have a tree-and-branch architecture, shown in this simple example as including a feeder fiber 32, a passive 1:N splitter/combiner 34 and a plurality of N distribution fibers 36 (also referred to at times as "drop fibers"). Feeder fiber 32 is connected between OLT 10 and splitter/combiner 34, with individual fibers 36*i* forming the plurality of N distribution fibers 36 used to couple individual ONUs 20*i* to splitter/combiner 34. In a typical environment, several OLTs may be located at a common central office (CO) of a communication network.

Feeder fiber 32 is used for the downstream transmissions from OLT 10 to the individual ONUs 20, as well as to support the upstream burst-mode transmissions from these same ONUs 20 back to OLT 10. The ability to maintain communication order among these various transmissions in a passive network configuration is provided by using a time-based system, with a time-division multiplex (TDM) protocol used in the downstream direction from OLT 10 to ONUs 20, and a time-division multiple access (TDMA) protocol used in the upstream direction from ONUs 20 to OLT 10. It should be evident that maintaining a common system clock between OLT 10 and ONUs 20 is a basic requirement for ensuring communication integrity within the PON.

The diagram of FIG. 1 is intended to illustrate that the individual ONUs 20 may be located at various distances from OLT 10, with different lengths of distribution fiber 36 necessarily required to provide the connection between the ONUs 20 and splitter/combiner 34. Given the requirement to maintain strict timing control of downstream and upstream transmissions, the delay associated with the different lengths of the plurality of N distribution fibers 36 forming ODN 30 needs to be taken into consideration in establishing scheduled transmissions within the PON. Also particularly illustrated in FIG. 1 is a new ONU 20*a* that is identified as beginning the activation process.

FIG. 2 contains a message flow diagram associated with an example activation process for establishing communication between OLT 10 and new ONU 20*a*. To initiate the process, OLT 10 may periodically broadcast a series of parameter learning messages across the network, communicating the configuration of the PON environment to all "attached" ONUs 20 (both established ONUs and any new ONUs). These messages typically include synchronization information and this phase of activation is thus sometimes referred to as the synchronization phase. New ONU 20*a* is initialized to collect profile information about the network, and at some point will energize its transmitter to enable two-way communication with OLT 10.

Upon expiration of the learning phase, OLT 10 begins a process of determining specific ONU operating parameters by entering the ONU discovery phase during which OLT 10 will broadcast a series of "serial number" grant messages across the network. These transmissions occur during a "quiet" window (here, referred to as a "discovery window" in FIG. 2), which is a defined time period where the established ONUs are not permitted to transmit data to the OLT. At some point in time within the discovery window, ONU 20*a* responds to a grant message by transmitting its serial number back to OLT 10. OLT 10 then associates a unique ID with the serial number of ONU 20*a* and once the discovery window closes, transmits this unique ID (an example of a specific ONU operating parameter) to ONU 20*a*. A "ranging window" then opens, where OLT 10 transmits a "directed ranging" grant message specifically to ONU 20*a*, as shown in FIG. 2. The ranging process is utilized by OLT 10 to determine the delay in communication with ONU 20*a* (which is a function of the path length within ODN 30 between OLT 10 and ONU 20*a*). The sending of this ranging grant initiates the ranging process during which OLT 10 prepares to perform a calculation of the time delay between transmitted and received messages. Again as shown in FIG. 2, ONU 20*a* responds to the ranging grant with a specific "registration" message during the ranging window time period. The ranging window is also a quiet period where established ONUs cannot transmit upstream data.

Based on the response time measured at OLT 10 (and/or, perhaps a different between the measured response time and an expected ideal response time), OLT 10 computes an equalization time delay ($\Delta\tau$) that will be used by ONU 20*a* going forward to adjust its timing for the transmission of burst-mode upstream data transmissions to OLT 10. As a following step in the activation process and as shown in FIG. 2, OLT 10 transmits this equalization delay message as another specific ONU operating parameter to ONU 20*a*, which responds by adjusting the start time of its upstream frame clock to account for the $\Delta\tau$ delay.

In reviewing the message flow of FIG. 2, it is clear that the burst-mode upstream messages transmitted by ONU 20*a* to OLT 10 during the activation process include both the transmission of the ONU's serial number, as well as a specific registration message that is used in the calculation of the equalization delay to be associated with ONU 20*a*. The presence of errors in the recovered versions of these messages as processed by the receiver at OLT 10 may result in the inability to establish bidirectional communication between OLT 10 and ONU 20*a* (if the recovered and decoded serial number is not in an expected format), or may result in a miscalculation of the equalization delay between the two elements (if the registration message is not properly decoded), which would result in ONU 20*a* not transmitting its upstream burst mode data transmission during its assigned time slot. As long as the upstream line rate used by the PON remains at speeds less 50 G, the receiver at the OLT is able to accurately recover the upstream activation messages from ONU 20*a*. However, as mentioned above, the introduction of the 50 G standard brings with it the presumption that the OLT receivers will include some type of equalization (e.g., digital signal processing (DSP)-based) to properly convert the 50 G upstream received optical signal into its electrical equivalent.

In particular, the use of a 50 G upstream line rate requires digital signal processing (in the form of equalizers) at the receiver components with the network to mitigate component bandwidth limitations, as well as a chromatic dispersion penalty inherent in transmitting through an optical fiber-based network. While the use of electronic equalization on the electrical signal recovered from the received optical signal enables the cost-effective use of standard, legacy (bandwidth-limited) components (such as, for example, the photodetectors for O/E conversion) for successful transmission, it is unlikely that the receiver at OLT 10 will exhibit the correct (and specific) equalization parameters during the ONU activation process, since it requires training time on the signal to obtain them. While one approach to addressing this problem is to increase the length of time that the discovery and ranging windows are open (allowing for ONU 20a to transmit multiple copies of the same message over a time period sufficient to train the OLT receiver), these extended time periods necessarily introduce latency into the PON, which is in conflict with a goal of using a 50 G upstream line rate to increase the volume of traffic that is handled by the PON over time. Indeed, latency is a signifi-cant parameter for many time-sensitive applications of the 50 G PON, including but not limited to, transport of mobile signals.

Accordingly, it is proposed to utilize upstream transmis-sions at line rate that is less than a predefined ONU upstream line rate during the ONU activation process. For example, with a predefined upstream line rate of 50 G, the use of a lower rate (such as 25 G or 12.5 G, for example) for an ONU's upstream burst-mode transmissions, the receivers within the OLT are capable of recovering the "serial num-ber" and "registration" messages from an ONU (such as ONU 20a) without the need to perform any type of equal-ization. Reducing their transmission rate from a predefined upstream line rate such as 50 G (or higher) to 25 G (or perhaps 12.5 G) is not considered to add an appreciable latency to the overall network performance, since the fol-lowing data transmissions (which obviously comprise mul-tiple messages sent over an extended period of time) com-prise the majority of the transmission that will transpire between OLT 10 and ONU 20a going forward.

Figure 3:
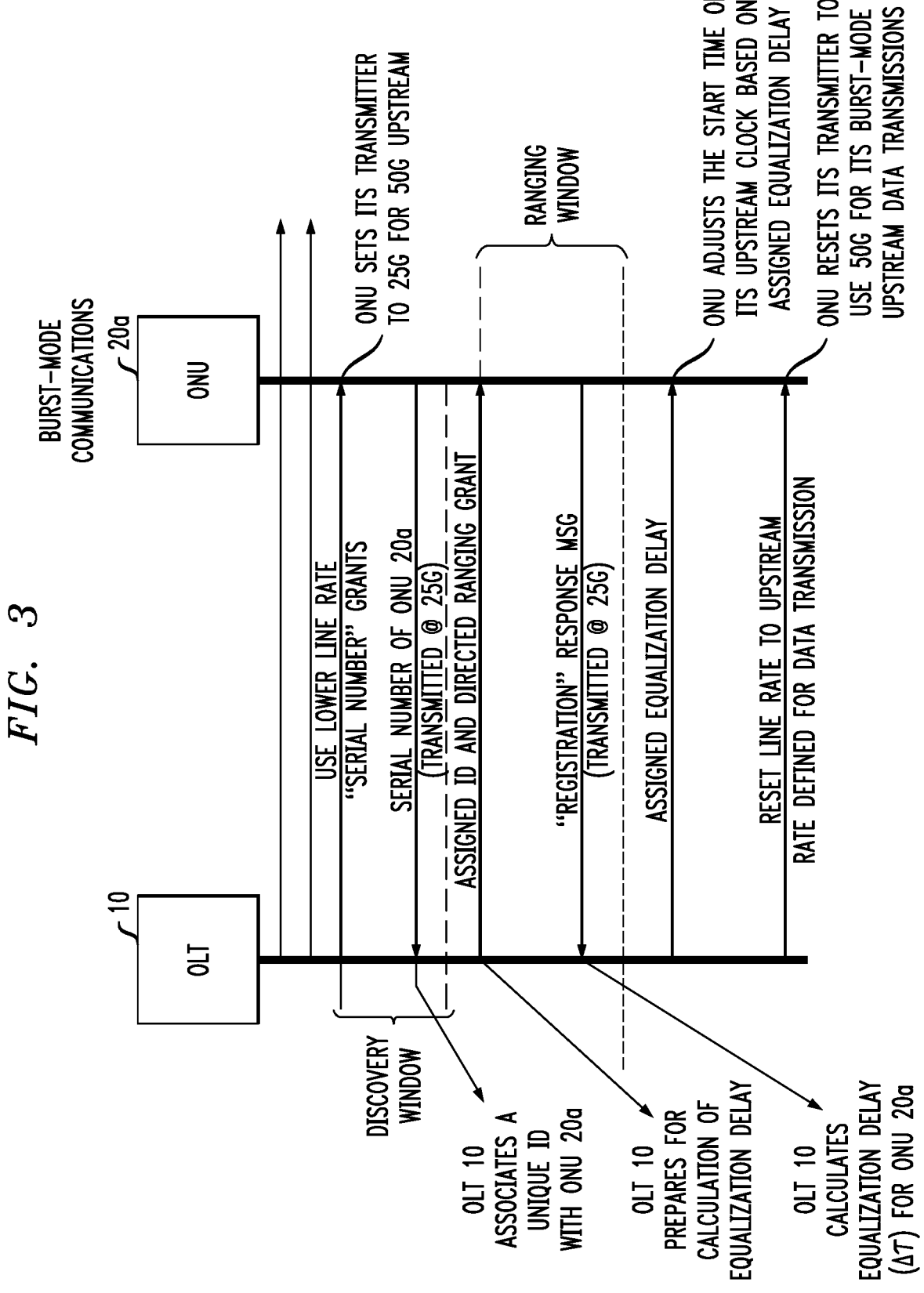
FIG. 3 is an updated message flow diagram, showing the inclusion of specific messages related to the disclosed low line rate activation process.

FIG. 3 is an updated version of the message flow diagram of FIG. 2, illustrating an example of the disclosed process for enabling activation of an ONU at a lower rate than the standard data transmission rate of a particular ONU. In this example, when the discovery window opens and OLT 10 begins to transmit downstream serial number grants, the grant message also includes an instruction for any respond-ing ONU 20 to use a "low line rate" speed for its upstream burst-mode transmissions during the activation process. This direct instruction from the OLT for the ONU to use a lower line may not be necessary in all situations, since new 50 G ONUS may be preconfigured to automatically use a lower line rate during activation. For explanatory purposes, a "low line rate" of 25 G is used, with the understanding that these elements are part of a 50 G PON. Since it is rather straight-forward to enable ONUs to operate at different line rates, the request to operate at a low line rate should not be problem-atic as long as a common (standardized) signaling is in place between the OLT and the ONUs for this purpose.

Any ONU responding to the serial number grant, such as ONU 20a in this example, will set its transmitter to operate at the lower line rate and respond to the serial number grant with a 25 G burst-mode transmission of its serial number. By virtue of transmitting this information at the 25 G line rate, the receiver at OLT 10 is able to properly decode the information, and proceeds to assign a unique ID (a specific ONU operating parameter) to ONU 20a. When the discov-ery window closes, OLT 10 initiates a directed ranging grant to ONU 20a, and includes the assigned ID number as part of that message. The same process as described above with FIG. 2 and known in the art follows, except that ONU 20a continues to use the lower line rate of 25 G and thus sends a burst-mode 25 G transmission of a "registration" message back to OLT 10. Again, the transmission of this information at 25 G (instead of the standard 50 G of the example PON), the receiver at OLT 10 is able to decode the information without the need to first equalize its performance, allowing for OLT 10 to calculate an accurate equalization delay for ONU 20a to use going forward during data transmission.

At the close of the ranging window, OLT 10 transmits the assigned equalization delay to ONU 20a and the ONU adjusts the start time of its upstream clock based on this delay value. The final message transmitted from OLT 10 at the end of the ranging phase may include an instruction for ONU 20a to now reset its transmitter to operate at the 50 G upstream rate, which ONU 20a will use going forward for upstream burst-mode transmissions to OLT 10. Alterna-tively, ONU 20a may be configured to automatically reset its transmitter to operate at 50 G upon reception of the equal-ization delay message from OLT 10.

Figure 4:
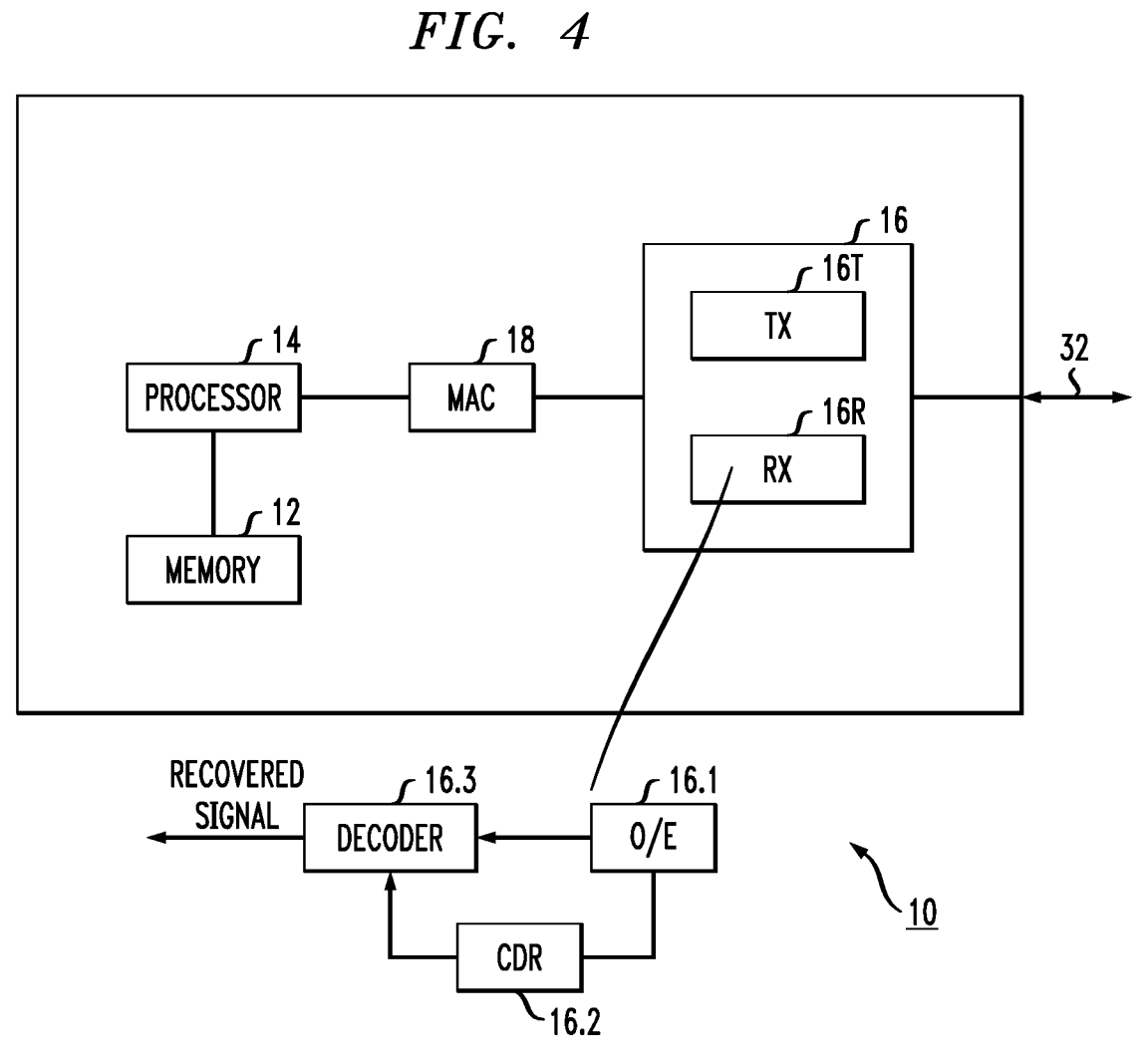

FIG. 4 is a block diagram of one example of OLT 10 configured to initiate and perform ONU activation at line rate that is lower than the standard upstream transmission rate. OLT 10 may include a memory 12, a processor 14, a transceiver 16, and a media access controller (MAC) 18. Memory 12 may store computer readable instructions for operating OLT 10, as well as the information to be sent to ONUs 20 or information received from the ONUs. Processor 14 may control OLT 10 (including memory 12, transceiver 16, and MAC 18) based on executing instructions stored in memory 12. Transceiver 16 includes a transmitter 16T and a receiver 16R, where the details of receiver 16R are more relevant to the present subject matter.

In this example block diagram, receiver 16R is shown as including an O/E module 16.1, a clock and data recovery (CDR) element 16.2 and a decoder 16.3. In operation, an incoming burst-mode transmission from an ONU is pro-vided as an input to O/E module 16.1, which functions to convert the incoming optical signal to its electrical equiva-lent. Thereafter, the electrical signal is applied as an input to both CDR 16.2 and decoder 16.3. These standard elements, without more are capable to properly convert and decode messages transmitted at less than 50 G, such as 25 G or 12.5 G.

At the initiation of the activation process and with refer-ence to the diagram of FIG. 3, MAC 18 may control OLT transmitter 16T to send a "line rate" message to ONU 20a, instructing ONU 20a to use 25 G burst-mode communica-tions on its upstream messaging with OLT 10. Once the activation process is completed (as recognized, for example, by MAC 18 and/or processor 16), MAC 18 instructs OLT transmitter 16T to send an updated "line rate" message to ONU 20a, in this case instructing ONU 20a to switch to the 50 G line rate for the following data transmission.

FIG. 5 is a flow chart of an example process that may be performed by an OLT to perform reduced line rate activation of an ONU. The process begins at step 500 with OLT 10 broadcasting downstream synchronization messages across the network. At this point in time, ONU 20a is operating in a "listening" mode, collecting protocol and burst profile information associated with the specific network. Once ONU 20a has sufficiently progressed along this initializa-tion, it will energize its transmitter (step 510) so that it will be able to respond to downstream communications from OLT 10. OLT 10 continues the process by broadcasting downstream "serial number grant" messages within the network (step 520). In the particular example process illus-trated in FIG. 5, OLT 10 includes with this grant message an instruction for ONUs to respond at a 25 G line rate. In other examples, the line rate instruction may be transmitted in a subsequent message from OLT 10.

Continuing with the description of the flow chart, ONU 20a recognizes and then responds to the serial number grant with a message including its specific serial number. In accordance with the disclosed principles, this message is transmitted to OLT 10 at the 25 G line rate. OLT receiver 16R proceeds to recover the transmitted serial number (step 540), assign a unique ID to this serial number and store this information in memory 12. When the pairing is completed, OLT 10 is instructed to transmit a direct communication to ONU 20a (step 550), the message included in the communication including the assigned ID. Following this, OLT 10 then transmits a "directed ranging grant" (step 560) to ONU 20a to initiate the ranging phase of the activation process. The ranging grant opens a "ranging window" which continues to suspend communication between OLT 10 and the established ONUs 20.

As part of the OLT's functionality it prepares processor 14 to be ready to measure a timing delay between OLT and ONU transmissions and then calculate the related equalization delay $\Delta\tau$. In response to the directed ranging grant, ONU responds with a "registration" message in a defined format (step 570). Again, this burst-mode message is transmitted to OLT 10 at the lower line rate of 25 G. Thus, receiver 16R at OLT 10 is able receive and properly decode the 25 G registration message (step 580) without need any equalization of the decoding process. The combination of processor 14 and MAC 16 use this received information, as well as the time stamp of the initial directed ranging grant to calculate the equalization delay $\Delta\tau$, sending this message to ONU 20a (step 580).

Upon receipt, ONU 20a adjusts its upstream frame clock to account for the equalization delay (step 590), completing the activation process. In association with the disclosed process, OLT 10 then transmits a message to ONU 20a (step 600) to update its line rate to the standard 50 G rate. Inasmuch as most ONUs are configured as multi-rate components, the ability to switch between 25 G and 50 G is a straightforward process and is likely to already be a capability built into the ONU (for example, used to switch between 50 G and 25 G when experiencing transmission problems within the PON). 482028

It is to be understood that while the illustrated examples describe the use of 25 G as a "lower line rate" as compared to a standard 50 G rate that may be used for upstream data transmission in the PON, other lower line rates are also acceptable for use (such as 12.5 G).

As used in this application, the term "circuitry" may refer to one or more or all of the following:
- (a) hardware-only circuit implementations such as implementations in only analog and/or digital circuitry,
- (b) combinations of hardware circuits and software, such as (as applicable):
  - (i) a combination of analog and/or digital hardware circuits(s) with software/firmware and
  - (ii) any portions of hardware processor(s) with software (including digital signal processor(s)), software, and memory(ies) that work together to cause an apparatus, such as a mobile phone or server, to perform various functions), and
- (c) hardware circuit(s) and/or processor(s), such as microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

It will furthermore be understood that the terms "comprising" or "comprise" do not exclude other elements or steps, that the indefinite articles "a" or "an" do not exclude a plurality, and that a single element, such as a computer system, a processor, or another integrated unit may fulfill the functions of several means as recited in the claims. Any reference signs in the claims shall not be construed as limiting the respective claims concerned. The identifying terms "first", "second", "third", "a", "b", "c", and the like, when used in the description or the claims are introduced to distinguish between similar elements or steps and are not necessarily describing a sequential or chronological order. Similarly, the descriptive terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

When an element is referred to as being "connected" or "coupled" to another element, it can be directly connected or coupled to the other element, or intervening elements may be present. By contrast, when an element is specifically referred to as being "directly connected", or "directly coupled", to another element, there are no intervening elements present. Other words used to describe the relationship between elements should be interpreted in like fashion (e.g., "between" versus "directly between", "adjacent" versus "directly adjacent", and the like).

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

What is claimed is:

1. An apparatus for use by an optical line terminal (OLT) in a passive optical network (PON), and communicatively connected to one or more high-rate optical network units (ONUs) operating at a predefined high upstream line rate, the apparatus comprising:

at least one memory including instructions;

at least one processor configured to execute the instructions and cause the apparatus to perform an ONU activation process including:

prior to recovering upstream activation messages, instructing the one or more high-rate ONUs to transmit the activation messages at a selected upstream line rate less than the predefined high upstream line rate;

recovering burst-mode upstream activation messages from a new high-rate ONU, the activation messages transmitted at the selected upstream line rate;

generating, in response to the recovered burst-mode activation messages, specific ONU operating parameters; and transmitting the specific ONU operating parameters to the new high-rate ONU.

2. The apparatus according to claim 1 wherein the apparatus is further caused to perform, subsequent to a completion of the ONU activation process, instructing the new high-rate ONU to switch its transmission rate to the predefined high upstream line rate.

3. The apparatus according to claim 1, wherein subsequent to the ONU activation process, the new high-rate ONU automatically switches its transmitter to operate at the predefined high upstream line rate.

4. The apparatus according to claim 1, wherein the predefined high upstream line rate is at least 50G and the selected line rate is no greater than 25G.

5. The apparatus according to claim 1, wherein during the process of generating specific ONU operating parameters, the apparatus is caused to perform:

transmitting a ranging request message to the new high-rate ONU:

measuring, in response to a recovered burst-mode reduced line rate registration message, a round-trip delay measurement;

computing an equalization delay for the new high-rate ONU from the measured round-trip delay measurement; and transmitting the computed equalization delay to the new high-rate ONU for use in adjusting its upstream frame clock.

6. The apparatus according to claim 1, wherein the specific ONU operating parameters include a unique ID associated with the new high-rate ONU and a specific equalization delay calculated for the new high-rate ONU.

7. A method, for use by an optical line terminal (OLT) communicatively connected to a plurality of ONUs within a passive optical network (PON), with one or more high-rate ONUs operating at a predefined high upstream line rate, comprising:

during an ONU activation process, prior to recovering upstream activation messages, instructing the one or more high-rate ONUs to transmit the activation messages at a selected upstream line rate less than the predefined high upstream line rate;

recovering burst-mode upstream activation messages from a new high-rate ONU, the activation messages transmitted at the selected upstream line rate;

generating, in response to the recovered burst-mode activation messages, specific ONU operating parameters; and transmitting the specific ONU operating parameters to the new high-rate ONU.

8. An apparatus, for use by an ONU operating at a predefined upstream line rate in a passive optical network (PON), the ONU communicatively connected to an OLT, the apparatus comprising:

at least one memory including instructions;

at least one processor configured to execute the instructions and cause the apparatus to perform an ONU activation process including:

prior to transmitting any upstream communications, receiving from the OLT an activation instruction message requesting the ONU to transmit upstream activation messages at a selected line rate less than the predefined upstream line rate;

transmitting burst-mode upstream activation messages to the OLT at the selected line rate less than the predefined upstream line rate;

receiving specific ONU operating parameters from the OLT in response to the upstream activation messages; and upon completion of the activation process, switching the burst-mode upstream transmission rate to the predefined upstream line rate.

9. The apparatus according to claim 8, wherein in performing the switching, the apparatus is further caused to perform, responding to an update line rate instruction from the OLT to switch its transmission rate to the predetermined high upstream line rate.

10. The apparatus according to claim 8, wherein in performing the switching, the new high-rate ONU automatically switches its transmitted to operating at the predefined high upstream line rate.

11. The apparatus according to claim 8, wherein the predefined high upstream line rate is at least 50G and the selected line rate is no greater than 25G.

12. A method, for using by high-rate ONUs communicatively connected to an OLT in a PON, comprising:

during an activation process at a new high-rate ONU, prior to transmitting any upstream communications, receiving from the OLT an activation instruction message requesting the ONU to transmit upstream activation messages at a selected line rate less than the predefined upstream line rate;

transmitting burst-mode upstream activation messages to the OLT at the selected line rate less than the predefined upstream line rate;

receiving specific ONU operating parameters from the OLT in response to the upstream activation messages; and upon completion of the activation process, switching the burst-mode upstream transmission rate to the predefined upstream line rate.

13. The method according to claim 12, wherein the switching step includes responding to an update line rate instruction from the OLT to switch its transmission to the predefined upstream line rate.

14. The method according to claim 12, wherein the switching step automatically commences at the completion of the activation process.

* * * * *